United States Patent [19]

Nakamura

[11] Patent Number: 5,276,767
[45] Date of Patent: Jan. 4, 1994

[54] FUZZY COMPUTER

[75] Inventor: Kazuo Nakamura, Itami, Japan

[73] Assignee: Mitsubishi Denki Kabushiki Kaisha, Tokyo, Japan

[21] Appl. No.: 12,603

[22] Filed: Feb. 2, 1993

Related U.S. Application Data

[63] Continuation of Ser. No. 918,164, Jul. 21, 1992, abandoned, which is a continuation of Ser. No. 619,633, Nov. 28, 1990, abandoned.

[30] Foreign Application Priority Data

Dec. 1, 1989 [JP] Japan .................................. 1-313751

[51] Int. Cl.$^5$ .............................................. G06F 9/44
[52] U.S. Cl. ...................................... 395/3; 364/807
[58] Field of Search ................... 395/3, 61; 364/602, 364/807

[56] References Cited

U.S. PATENT DOCUMENTS

| | | | |
|---|---|---|---|
| 4,760,896 | 8/1988 | Yamaguchi | 395/61 |
| 4,875,184 | 8/1989 | Yamakawa | 364/602 |
| 4,947,965 | 8/1990 | Kuzunuki et al. | 187/127 |
| 5,012,430 | 4/1991 | Sakurai | 364/131 |
| 5,073,863 | 12/1991 | Zhang | 395/3 |
| 5,185,849 | 2/1993 | Miyazawa et al. | 395/61 |

OTHER PUBLICATIONS

"Implemeting Fuzzy Rule-Based Systems on Silicon Chips", Lim et al., IEEE Expert, Feb. 1990.

*Primary Examiner*—Allen R. MacDonald
*Assistant Examiner*—George Davis
*Attorney, Agent, or Firm*—Townsend and Townsend Khourie and Crew

[57] ABSTRACT

A fuzzy computer which adopts hardware arrangement to simultaneously execute the upper bound cut, the maximum value operation, and the calculation of the center of gravity by directing attention to that the membership functions are overlapped double or triple at the best with each other when fuzzy operation is carried out, or which adopts software arrangement capable of executing the processing equivalent to the above hardware arrangement by employing a general microprocessor system, then, the number of comparison operation in the upper bound cut and maximum value operation is reduced, accordingly, executing the upper bound cut, the maximum value operation, and the calculation of the center of gravity at higher speed.

6 Claims, 13 Drawing Sheets

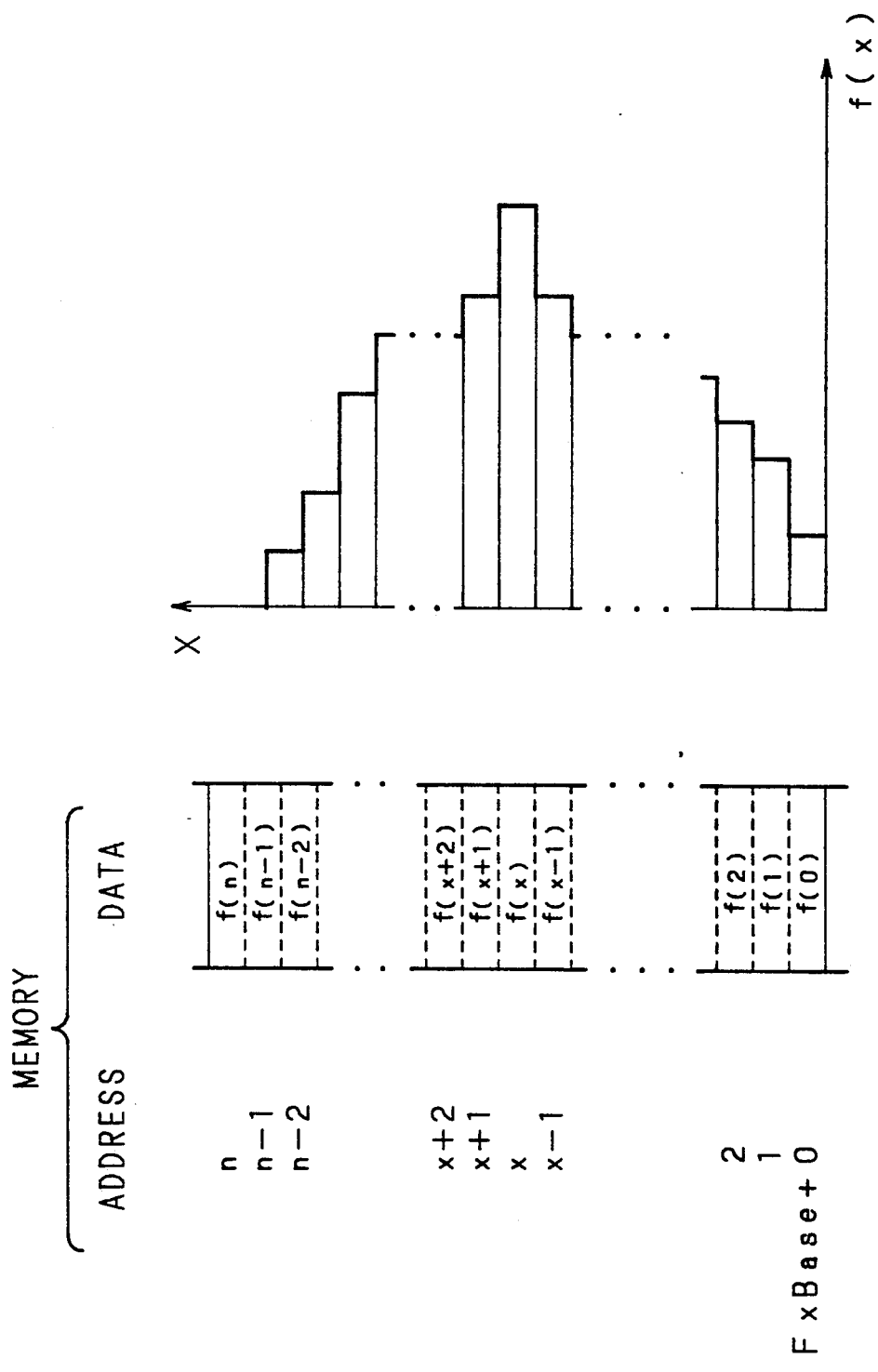

Fig. 3(a)
Prior Art

```
LINE
 1          MOV     BX, FxBase      ; HOLD BASE ADDRESS OF f(x) IN BX
 2  ; f(x) <---- g1(x)
 3          MOV     SI,63           ; INITIAL VALUE OF x=63 (x IS SI)
 4  RptFc1: CALL    FUNC1           ; CALCULATION OF g1(x)
 5          CMP     AL,CL           ; COMPARISON WITH c1 (CL HOLDS c1)
 6          JLE     SkpFc1          ; IF g1(x)≤c1 THEN JUMP
 7          MOV     AL,CL           ; PREPARATION OF c1
 8  SkpFc1: MOV     [BX] + [SI],AL  ; TRANSFERRING OF g1(x) OR c1 AS f(x)
 9          SUB     SI,1            ; SUBTRACTION OF x
10          JNS     RptFc1          ; REPETITION UNTIL x BECOMES NEGATIVE
11  ; f(x) <---- MAX(f(x), g2(x))
12          MOV     SI,63           ; INTIAL VALUE OF x=63 (x IS SI)
13  RptFc2: CALL    FUNC2           ; CALCULATION OF g2(x)
14          CMP     AL,CH           ; COMPARISON WITH c2 (CH HOLDS c2)
15          JLE     SkpFc2          ; IF g2(x)≤c2 THEN JUMP
16          MOV     AL,CH           ; PREPARATION OF c2
17  SkpFc2: CMP     AL, [BX] + [SI] ; COMPARISON OF g2(x) AND f(x)
18          JLE     CntFc2          ; IF g2(x)≤f(x) THEN JUMP
19          MOV     [BX] + [SI],AL  ; TRNSFERRING g2(x) AS f(x)
20  CntFc2: SUB     SI,1            ; SUBTRACTION OF x
21          JNS     RptFc2          ; REPETITION UNTIL x BECOMES NEGATIVE
22  ; f(x) <---- MAX(f(x), g3(x))
23          MOV     SI,63           ; INTIAL VALUE OF x=63 (x IS SI)
24  RptFc3: CALL    FUNC3           ; CALCULATION OF g3(x)
25          CMP     AL,DL           ; COMPARISON WITH c3 (DL HOLDS c3)
26          JLE     SkpFc3          ; IF g3(x)≤c3 THEN JUMP
27          MOV     AL,DL           ; PREPARATION OF c3
28  SkpFc3: CMP     AL, [BX] + [SI] ; COMPARISON OF g3(x) AND f(x)
29          JLE     CntFc3          ; IF g3(x)≤f(x) THEN JUMP
30          MOV     [BX] + [SI],AL  ; TRNSFERRING g3(x) AS f(x)
31  CntFc3: SUB     SI,1            ; SUBTRACTION OF x
32          JNS     RptFc3          ; REPETITION UNTIL x BECOMES NEGATIVE
33  ; f(x) <---- MAX(f(x), g4(x))
34          MOV     SI,63           ; INTIAL VALUE OF x=63 (x IS SI)
35  RptFc4: CALL    FUNC4           ; CALCULATION OF g4(x)
36          CMP     AL,DH           ; COMPARISON WITH c4 (DH HOLDS c4)
37          JLE     SkpFc4          ; IF g4(x)≤c4 THEN JUMP
38          MOV     AL,DH           ; PREPARATION OF c4
39  SkpFc4: CMP     AL, [BX] + [SI] ; COMPARISON OF g4(x) AND f(x)
40          JLE     CntFc4          ; IF g4(x)≤f(x) THEN JUMP
41          MOV     [BX] + [SI],AL  ; TRNSFERRING g4(x) AS f(x)
42  CntFc4: SUB     SI,1            ; SUBTRACTION OF x
43          JNS     RptFc4          ; REPETITION UNTIL x BECOMES NEGATIVE
44  ; CALCULATION OF CENTER GRAVITY
```

Fig. 3(b)
   Prior Art

```
LINE
45              MOV     SI,63           ; SI BECOMES j
46              MOV     AX,0            ; AX BECOMES Qj
47              MOV     DI,0            ; DI BECOMES Pj
48     Nextj:   ADD     DI,AX           ; ADDITION OF Qj TO Pj
49              ADD     AL, [BX] + [SI] ; ADDITION OF f(j) TO LOWER
                                          8 BITS OF Qj
50              ADDC    AH,0            ; ADDITION OF CARRY TO HIGHER 8
                                          BITS OF Qj
51              SUB     SI,1            ; SUBTRACTION OF 1 FROM j
52              JNS     NextJ           ; IF J>0 THEN RETURN TO Next J
```

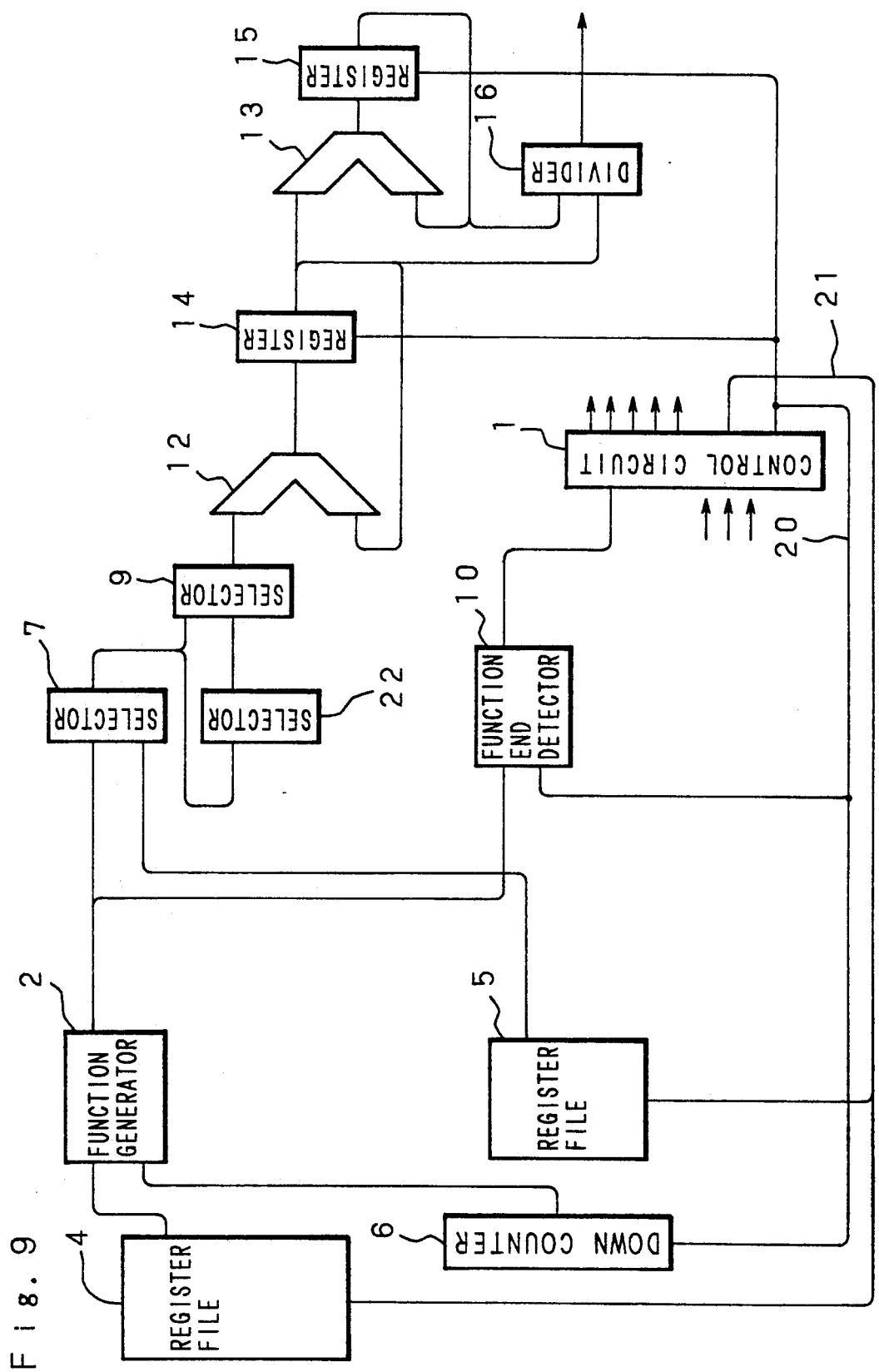

Fig. 10(a)

```
LINE
 1          MOV    SI,63              ; INITIAL VALUE x=j=63
 2          MOV    AX,0               ; DI BECOMES Pj
 3          MOV    DI,0               ; AX BECOMES Qj
 4    ;
 5          MOV    BP,1+63-56         ; REGION 56≤x≤63
 6   Rpt4:  MOV    BL,[SI]+(sB-40)    ; LOADING OF s4(x)
 7          CMP    BL,DH              ; COMPARISON WITH c4 (DH HOLDS c4)
 8          JLE    Skp40              ; IF s4(x)≤c4 THEN JUMP
 9          MOV    BL,DH              ; PREPARATION OF c4
10   Skp40: ADD    DI,AX              ; ADDITION OF Qj TO Pj
11          ADD    AL,BL              ; ADDITION OF f(j) TO LOWER 8 BITS OF Qj
12          ADDC   AH,0               ; ADDITION OF CARRY TO HIGHER 8 BITS OF Qj
13          DEC    SI                 ; SUBTRACTION OF 1 FROM x
14          DEC    BP                 ; SUBTRACTION OF COUNTER REPEATEDLY
15          JNZ    Rpt4               ; REPETITION BY (1+63-56) TIMES
16    ;
17          MOV    BP,56-40           ; REGION 40≤x<56
18   Rpt3:  MOV    BL,[SI]+(sB-40)    ; LOADING OF s4(x)
19          CMP    BL,DH              ; COMPARISON WITH c4 (DH HOLDS c4)
20          JLE    Skp30              ; IF s4(x)≤c4 THEN JUMP
21          MOV    BL,DH              ; PREPARATION OF c4
22   Skp30: MOV    BH,[SI]+(sB-24)    ; LOADING OF s3(x)
23          CMP    BH,DL              ; COMPARISON WITH c3 (DL HOLDS c3)
24          JLE    Skp31              ; IF s3(x)≤c3 THEN JUMP
25          MOV    BH,DL              ; PREPARATION OF c3
26   Skp31: CMP    BH,BL              ; COMPARISON OF BH AND BL
27          JLE    Skp32              ; IF BH≤BL THEN JUMP
28          MOV    BL,BH              ; TRANSFERRING BH TO BL
29   Skp32: ADD    DI,AX              ; ADDITION OF Qj TO Pj
30          ADD    AL,BL              ; ADDITION OF f(j) TO LOWER 8 BITS OF Qj
31          ADDC   AH,0               ; ADDITION OF CARRY TO HIGHER 8 BITS OF Qj
32          DEC    SI                 ; SUBTRACTION OF 1 FROM x
33          DEC    BP                 ; SUBTRACTION OF COUNTER REPEATEDLY
34          JNZ    Rpt3               ; REPETITION BY (56-40) TIMES
35    ;
36          MOV    BP,40-24           ; REGION 24≤x<40
37   Rpt2:  MOV    BL,[SI]+(sB-8)     ; LOADING OF s2(x)
38          CMP    BL,DH              ; COMPARISON WITH c2 (CH HOLDS c2)
39          JLE    Skp20              ; IF s2(x)≤c2 THEN JUMP
40          MOV    BL,CH              ; PREPARATION OF c2
41   Skp20: MOV    BH,[SI]+(sB-24)    ; LOADING OF s3(x)
42          CMP    BH,DL              ; COMPARISON WITH c3 (DL HOLDS c3)
43          JLE    Skp21              ; IF s3(x)≤c3 THEN JUMP
44          MOV    BH,DL              ; PREPARATION OF c3
45   Skp21: CMP    BH,BL              ; COMPARISON OF BH AND BL
46          JLE    Skp22              ; IF BH≤BL THEN JUMP
47          MOV    BL,BH              ; TRANSFERRING BH TO BL
48   Skp22: ADD    DI,AX              ; ADDITION OF Qj TO Pj
49          ADD    AL,BL              ; ADDITION OF f(j) TO LOWER 8 BITS OF Qj
50          ADDC   AH,0               ; ADDITION OF CARRY TO HIGHER 8 BITS OF Qj
```

Fig. 10(b)

```
LINE
51            DEC   SI                  ; SUBTRACTION OF 1 FROM x
52            DEC   BP                  ; SUBTRACTION OF COUNTER REPEATEDLY
53            JNZ   Rpt2                ; REPETITION BY (40-24) TIMES
54       ;
55            MOV   BP,24-8             ; REGION 8≤x<24
56   Rpt1:    MOV   BL,[SI]+(sB-8)      ; LOADING OF s2(x)
57            CMP   BL,DH               ; COMPARATION WITH c2 (CH HOLDS c2)
58            JLE   Skp10               ; IF s2(x)≤c2 THEN JUMP
59            MOV   BL,CH               ; PREPARATION OF c2
60   Skp10:   MOV   BH,[SI]+(sB+8)      ; LOADING OF s1(x)
61            CMP   BH,CL               ; COMPARATION WITH c1 (CH HOLDS c3)
62            JLE   Skp11               ; IF s1(x)≤c1 THEN JUMP
63            MOV   BH,CL               ; PREPARATION OF c1
64   Skp11:   CMP   BH,BL               ; COMPARATION OF BH AND BL
65            JLE   Skp12               ; IF BH≤BL THEN JUMP
66            MOV   BL,BH               ; TRANSFERRING BH TO BL
67   Skp12:   ADD   DI,AX               ; ADDITION OF Qj TO Pj
68            ADD   AL,BL               ; ADDITION OF f(j) TO LOWER 8 BITS OF Qj
69            ADDC  AH,0                ; ADDITION OF CARRY TO HIGHER 8 BITS OF Qj
70            DEC   SI                  ; SUBTRACTION OF 1 FROM x
71            DEC   BP                  ; SUBTRACTION OF COUNTER REPEATEDLY
72            JNZ   Rpt1                ; REPETITION BY (24-8) TIMES
73       ;
74            MOV   BP,8-0              ; REGION 0≤x<8
75   Rpt0:    MOV   BL,[SI]+(sB+8)      ; LOADING OF s1(x)
76            CMP   BL,CL               ; COMPARATION WITH c1 (CL HOLDS c1)
77            JLE   Skp00               ; IF s1(x)≤c1 THEN JUMP
78            MOV   BL,CL               ; PREPARATION OF c1
79   Skp00:   ADD   DI,AX               ; ADDITION OF Qj TO Pj
80            ADD   AL,BL               ; ADDITION OF f(j) TO LOWER 8 BITS OF Qj
81            ADDC  AH,0                ; ADDITION OF CARRY TO HIGHER 8 BITS OF Qj
82            DEC   SI                  ; SUBTRACTION OF 1 FROM x
83            DEC   BP                  ; SUBTRACTION OF COUNTER REPEATEDLY
84            JNZ   Rpt0                ; REPETITION BY (1+63-56) TIMES
85       ;
```

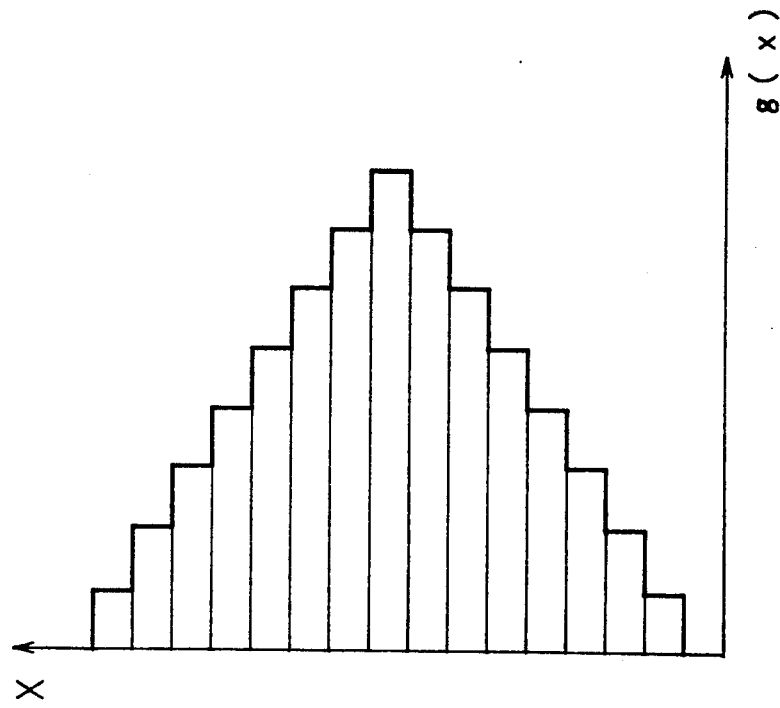
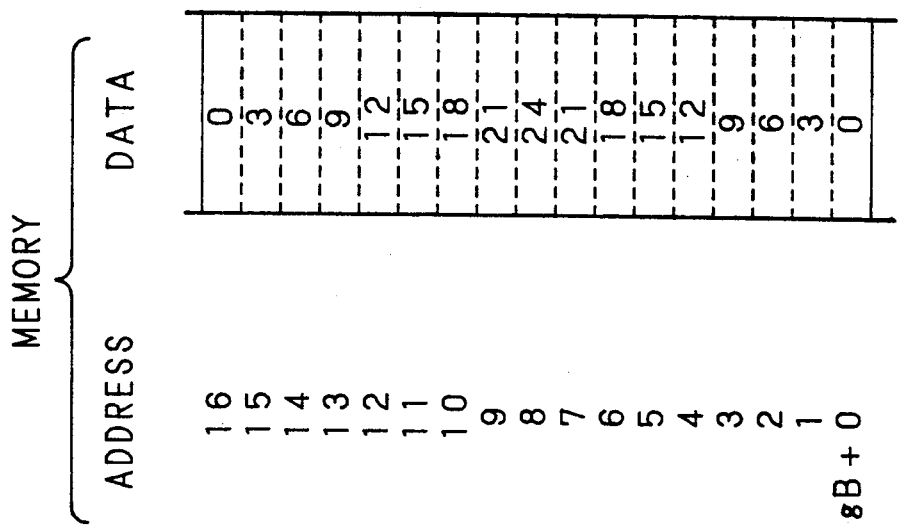
Fig. 11

FUZZY COMPUTER

CROSS-REFERENCE TO RELATED APPLICATIONS

This application is an FWC continuation of application Ser. No. 07/918,164, filed Jul. 21, 1992, now abandoned, which was an FWC continuation of application Ser. No. 07/619,633, filed Nov. 28, 1990, now abandoned.

BACKGROUND OF THE INVENTION

1. Field of the Invention

This invention relates to a fuzzy computer capable of promptly calculating the center of gravity of a membership function.

2. Description of the Related Art

When a fuzzy operation is executed, in order to convert input x into information capable of being operated, it is necessary to calculate a function f(x) for the input x and then to calculate the center of gravity of the function as described in Tshio Terano et al, A Guide to the Fuzzy Computer System, Ohm Book Company, Inc., Apr. 30, 1987, pp. 150-152.

When a digital operation is executed, this function f(x) is defined as integer values f(0), f(1), f(2) . . . f(n−1), f(n) in discrete values x (x=0, 1, 2 . . . n−1, n). In general, when these functions f(x) are to be stored in a memory, these are stored from some address (FxBase in FIG. 1) sequentially in the order of f(0), f(1), f(2) . . . f(n−1), f(n) in the memory as shown in FIG. 1.

In FIG. 1, the left half portion shows the addresses and data of the memory, so does the right half portion configurations of the functions f(x).

As shown in FIG. 2 (a) through (e), in order to have the functions f(x) when the fuzzy operation is carried out, the portion of more than some value is cut (hereinafter referred to as the upper bound cut) from each of a plurality of basic functions (called membership functions) and then the maximum value of each input x is obtained to have the fuzzy function (hereinafter referred to as the maximum value operation).

In other words, the portions more than the respective values (the upper bound cut values) c1, c2, c3, c4 are cut from the functions g1(x), g2(x), g3(x), g4(x) shown in FIG. 2 (a) through (d), respectively, as a result, the portions in which the maximum value operation is provided are to be such a function f(x) shown in FIG. 2(e).

Now will be described in brief below the method of calculating the center of gravity of the function by the digital operation.

When calculating the center of gravity of each of the above functions for the values f(0), f(1), f(2) . . . f(n−1), f(n), these are defined with the value P/Q which is obtained by dividing such an equation P by such a equation Q as follows:

$$P = f(0) \times 0 + f(1) \times 1 + f(2) \times 2 + \ldots + f(n-1) \times (n-1) + f(n) \times n$$

$$Q = f(0) + f(1) + f(2) + \ldots f(n-1) + f(n).$$

Here, the equation P can be designated as follows:

$$P = (f(n)) + (f(n) + f(n-1)) + \ldots + (f(n) + f(n-1) + \ldots + f(2) + f(1)).$$

Then, in the case where the equation $Q_j$ is established as $$Q_j = f(n) + f(n-1) + f(n-2) + \ldots + f(j+1) + f(j),$$

the equation P becomes as $$P = Q_n + Q_{n-1} + Q_{n-2} + \ldots + Q_2 + Q_1.$$

Furthermore, $Q_j$ designates the intermediate calculation results of Q, accordingly, P and Q can be obtained by the following operation steps.

(1) Assuming that j=n, $Q_j=0$, $P_j=0$,
(2) $Q_j$ is added to $P_j$, and f(j) is added to $Q_j$, respectively.
(3) 1 is subtracted from j.
(4) Operations in the steps (2), (3) are repeated until j becomes less than 0.
(5) The equations $Q=Q_j$, $P=P_j$ are established.

Incidentally, there has existed no fuzzy computer of special purpose of executing such operations as described above, then, as means for executing the operations, there has been used nothing but a general purpose microprocessor. In the case where the operations are executed by MICROPROCESSOR 8088 manufactured by Intel Corp., for example, it has been necessary to make such a program as shown in FIG. 3. Meanwhile, the enlarged function f(x) of FIG. 2 is shown to be more in detail in FIG. 4.

FIG. 5 is a block diagram to illustrate the construction of the above-mentioned MICROPROCESSOR 8088 manufactured by Intel Corp.

In FIG. 5, the portion of MICROPROCESSOR 8088 is designated by both reference numerals 30 and 31, which designate an execution unit and a bus interface unit, respectively.

Reference numeral 32 designates the external memory which stores a program being as control data as well as works as means for storing data when the program is being carried out.

The execution unit 30 consists of an execution unit controller 33, a register file 34, an ALU 35, a flag register 36, and the internal bus 37, and the like.

The register file 34 consists of 8 sets of 16 bit-register which are called AX, BX, CX, DX, SI, DI, BP, and SP, respectively. Among these registers, each of the AX, BX, CX, and DX registers can be used to be divided into two sets of 8 bit-registers which are called AL and AH, BL and BH, CL and CH, and DL and DH, respectively.

The bus interface unit 31 controls data transfer between the external memory 32 and execution unit 30. In other words, the bus interface unit 31 performs the reading instructions and read/write of data in and from the external memory 32. Meanwhile, explanation on detailed construction of the bus interface unit 31 is not directly related to the description here, being omitted.

The execution unit 30 executes instructions.

The execution unit controller 33 decodes the instruction which was read, and controls execution of the instruction in the execution unit 30.

Both of the register file 34 and the flag register 36 store data in the execution unit 30.

The ALU 35 is an operation unit, and the internal bus 37 is a path for data transfer.

In the case where it is necessary to store such conditions as that carry is generated, operation results are negative, operation results are zero, and the like, these conditions are stored in their corresponding bits in the flag register 36. And the content of the flag register will be referred to as branch conditions of an branch instruction and the like.

Now will be described below the program of FIG. 3. The 3rd through 43rd lines of the figure designate the portion to be executed the upper bound cut and the maximum value operation. Incidentally, in those lines, it is assumed that the upper bound cut values c1, c2, c3, c4 in the processing of the upper bound cut have been loaded preliminarily in the four registers CL, CH, DL, DH as the initial state.

In FIG. 3, each of the 2nd, 11th, 22nd, 33rd and 44th lines designates comments (comments being designated after the mark ";" in some lines). And the 3rd through 10th lines designate processings of cutting the upper bound of the function g1(x) and storing this cut results as the initial value of the function f(x) in the memory as shown in FIG. 1 (here assuming that n=63).

Among the above lines, first, in the 3rd line, 63 is loaded in the SI register as the initial value of variable x.

And in the 4th line, a subroutine FUNC1 which calculates the function value g1(x) is called, and the function value g1(x) is stored in the AL register.

The subroutine FUNC1 calculates the function value with the variable x which is stored in the SI register as its input, and stores the function value of the calculation results as its output in the AL register, however, the content of this subroutine has no direct relation with the description here, being omitted. As in the same way as the content of this subroutine FUNC1, there is omitted explanation on the contents of the subroutines FUNC2, FUNC3 and FUNC4 which calculate such function values g2(x), g3(x) and g4(x), respectively which will be referred to later.

Then, in the 5th line, a comparison is made between the function value g1(x) being stored in the AL register and the upper bound cut value c1 being stored in the CL register, and when the upper bound cut value c1 is smaller than the function value g1(x), the upper bound cut value c1 is transferred to the AL register. In other words, the upper bound cut is carried out. On the other hand, when the upper bound cut value c1 is larger than the function value g1(x), the function value g1(x) is being stored in the AL register.

And in the 8th line, the content of the AL register (upper bound cut value c1 or function value g1(x)) is transferred to the memory as the initial value of the function f(x). In the 8th line, [BX]+[SI] designates a memory with an address having the value which is made by adding the content of the BX register to the content of the SI register, and because the FxBase is loaded in the BX register and the variable x is stored in the SI register in the 1st line, [BX]+[SI] is to designate the function f(x) of FIG. 1.

The above description is processings for one element.

After the processings in the 1st through 8th lines are completed, in the 9th line, 1 is subtracted from the SI register in which the variable x is being stored, and this subtraction is repeated until the variable x of the subtraction results becomes negative.

The 10th line designates an instruction to jump to RptFc1 when operation results just before the subtraction results are not negative. Accordingly, the above subtraction is repeated 64 times until the variable x becomes from 63 to 0, as a result, the function g1(x) whose upper bound was cut is to be stored in the address FxBase through FxBase+63 of the memory.

Now will be described below processings in the 12th through 21st lines. These lines shows both the upper bound cut and the maximum value operation of the function g2(x).

In the 16th line in the figure, the processings until the upper bound cut is carried out are the same as those for the above-mentioned function g1(x). In this case, however, there are employed the subroutine FUNC2 as a subroutine which generates the function and the CH register as the upper bound cut value in the processing of the upper bound cut, respectively.

Then, in the 17th line, there is made a comparison between the function value g2(x) being stored in the AL register after its upper bound is cut and the function value f(x) being stored in the memory. And where the function value g2(x) is larger than the function value f(x), in the 18th line, the function value g2(x) is transferred to a position where the function value f(x) is being stored in the memory. On the other hand, where the function value g2(x) is smaller than the function value f(x), the function value f(x) is to be left as it is. In other words, the maximum value operation is to be carried out.

In the 20th and 21st lines, as in the same way as in the case of the function g1(x), subtraction of the variable x and control of repeat processing are carried out, and the above processing is repeated until the variable x becomes from 63 to 0.

As a result, the function values g1(x) and g2(x) whose upper bounds were cut and for which the maximum value operation were provided are to be stored in the addresses FxBase through FxBase+63 of the memory.

The same upper bound cut and maximum value operation as mentioned above are carried out for the function g3(x) in the 23rd through 32nd lines, so are for the function g4(x) in the 34th through 43rd lines.

As a result, in the 45th line, results of the upper bound cut and maximum value operation for each of the functions g1(x), g2(x), g3(x) and g4(x) are to be stored in the addresses FxBase through FxBase+63 of the memory, respectively.

In the 45th through 52nd lines, calculation of the center of gravity is carried out according to procedures of the above-mentioned processings.

In the 45th through 47th lines, j, $Q_j$ and $P_j$ are initialized, and the values 63, 0, and 0 are loaded in the SI register, the AX register, and the DI register, respectively.

In the 48th and 50th lines, $Q_j$ is added to $P_j$, and f(j) is added to $Q_j$, respectively, and in the 48th line, the content of the AX register is added to the content of the DI register.

In the 49th line, since f(j) of 8 bits is being stored, f(j) is added to the content of the AL register (8 low order bits of AX register), first. And in the 50th line, carry is added to the AH register (8 high order bits of AX register).

As a result, f(x) of 8 bits is added to the content of the Ax register of 16 bits.

In the 51st and 52nd lines, the subtraction of j and the control of repeating the subtraction are carried out, and control is carried out so that the above processing can be repeated until j becomes from 63 to 0.

A summary of the processings of the program of FIG. 3 is as mentioned above. After this program is carried out, Q is obtained in the AX register and P is obtained in the DI register, respectively, accordingly, the value of the center of gravity can be obtained by dividing Q by P.

Incidentally, among those membership functions, there are not more than two or three functions which overlaps with each other, that is, which have the values excepting 0 as their respective variables x, and it is rare occasion that more than four functions have the values excepting 0 as the same variable x.

For example, in FIG. 4, in the case where the variable x is 28, the functions g2(x), g3(x) alone have the values excepting 0, and other functions g1(x), g4(x) have the value 0. In other words, in the program of FIG. 3, there are made comparisons for all of the functions g2(x), g3(x), g4(x) for the upper bound cut and the maximum value operation, as a result, three times of comparison are made for the respective variables x.

However, there are two functions which overlaps with each other, then, in reality, it is necessary to make only one comparison for the respective variables x of the two functions, and it is not necessary to make other two times of comparison here. For example, in the case where the variable x is 28, the upper bound cut is carried out for the functions g2(x), g3(x) alone, and then there is made a comparison between both of the functions after the upper bound cut was provided to select the larger one, as a result, it is not necessary to take the functions g1(x) and g4(x) into consideration.

In the above conventional fuzzy computer, the upper bound cut and the calculation of the center of gravity have been carried out according to the above procedures, and these conventional operations entail a lot of useless comparison processings, as a result, there exists a problem that it takes long time to calculate the center of gravity of the function.

SUMMARY OF THE INVENTION

The foregoing problem is solved in accordance with the present invention. The primary object of the present invention is to provide a fuzzy computer capable of operating at high speed.

The first invention of the fuzzy computer of the present invention adopts hardware arrangement which is provided with function generating means, selecting means for selecting the smaller one by comparing a function value which is generated by the function generating means with the upper bound cut value and then selecting and outputting the smaller value, the first adding means and register for integrating the values which are outputted by the selecting means, the second adding means and register for further integrating the integration results which are being held in the first register, and dividing means for dividing the values being held in the both registers, so that this fuzzy computer can simultaneously execute the upper bound cut, the maximum value operation, and calculation of the center of gravity by directing attention to the fact that the membership functions are overlapping double or triple with each other at the most. By such hardware arrangement, when the integration operation for obtaining the center of gravity is carried out, the upper bound value cut and the maximum value operation are carried out for only the function values excepting 0 of the respective input values, and the obtained values are integrated, and then the number of comparison in the upper bound cut and the maximum value operation is reduced, which realizing high-speed operation processing.

And, the second invention of the fuzzy computer of the present invention is provided with a hardware for detecting the end of generation of the functions in addition to the above hardware arrangement. Then, the end of generation of the functions is detected by this hardware, as a result, higher-speed operation processing is to be realized.

Furthermore, the third invention of the fuzzy computer of the present invention adopts such arrangement as that software capable of executing the processing equivalent to the above hardware arrangement can be used by a general microprocessor system. By adopting this arrangement, the general microprocessor system can perform the operations similar to the fuzzy computer of the first invention, as a result, high-speed operation processing is to be realized.

The above and further objects and features of the invention will more fully be apparent from the following detailed description with accompanying drawings.

BRIEF DESCRIPTION OF THE DRAWINGS

FIG. 1 is a schematic view to explain the state of a case where functions shown in FIG. 4 are being stored on a memory;

FIGS. 3(a) and 3(b) are examples of a program for calculating the center of gravity of each of the functions according to the conventional software procedures by the conventional microprocessor system;

FIGS. 8 and 9 are block diagrams to illustrate other embodiments of the fuzzy computer in accordance with the first invention of the present invention, respectively;

FIGS. 10(a) and 10(b) is a schematic view to illustrate an example of a program which is a software to be used in the third invention of the present invention; and FIG. 11 is an arrangement plan of a memory to be used in the program of FIG. 10.

DESCRIPTION OF THE PREFERRED EMBODIMENTS

Now will be described below preferred embodiments of the present invention in detail with reference to the accompanying drawings.

Figure 6:
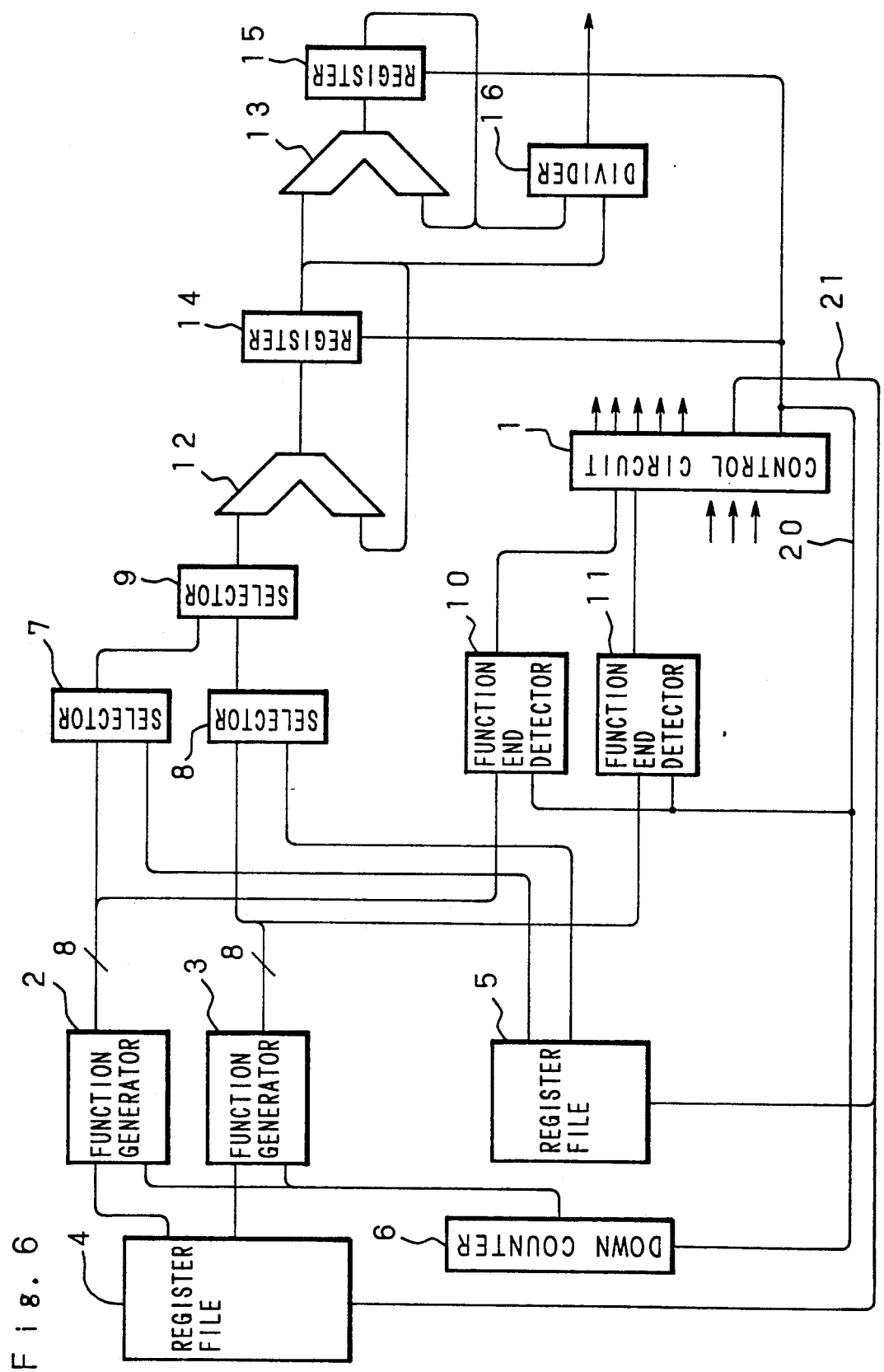
FIG. 6 is a block diagram to illustrate hardware arrangement of the fuzzy computer in accordance with the first invention of the present invention.

FIG. 6 is a block diagram to illustrate arrangement of the fuzzy computer in accordance with the present invention.

In FIG. 6, reference numeral 1 designates a control circuit which controls the whole fuzzy computer system.

Reference numerals 2 and 3 designate function generation units which are connected to output of a register file 4 and to output of a down counter 6, respectively.

The register file 4 holds a register pointer 21 which is sent from the control circuit 1 and sends this to the above-mentioned function generation units 2 and 3.

The reference numeral 5 also designates a register file which holds the register pointer 21 being sent from the control circuit 1 and sends this to both of selectors 7 and 8 which will be referred to later.

The down counter 6 counts down a counter clock 20 which is outputted from the control circuit 1 and sends the countdown results to the function generation units 2 and 3.

The selector 7 selects either a function value which is given from the function generation unit 2 or a value which is given from the register file 5, and outputs this to a selector 9.

The selector 8 selects either a function value which is given from the function generation unit 3 or the value which is given from the register file 5, and outputs this to the selector 9.

The selector 9 selects either output of the selector 7 or output of the selector 8, and outputs this to an adder 12.

Reference numerals 10 and 11 designate function end detectors. A function value outputted from the function generation unit 2 is sent to the function end detector 10, and a function value outputted from the function generation unit 3 is sent to the function end detector 11, respectively as well as the counter clock 20 outputted from the control circuit 1 is sent to both of the function end detectors 10 and 11, both of which detecting the end of the functions. And the detection results of the end of the functions detected by both of the function end detectors are sent to the control circuit 1.

The adder 12 adds output of the selector 9 to output of a register 14, and output of this adder 12 itself, that is, the addition results are to be stored in the register 14. Accordingly, the adder 12 integrates the output of the selector 9.

Reference numeral 13 also designates an adder which adds the output of the register 14 to output of a register 15. Output of this adder 13 itself is stored in the register 15, accordingly, the adder 13 integrates the output of the register 14.

The outputs of the both registers 14 and 15 are also sent to a divider 16 which executes division of the outputs of the both registers.

Figure 7:
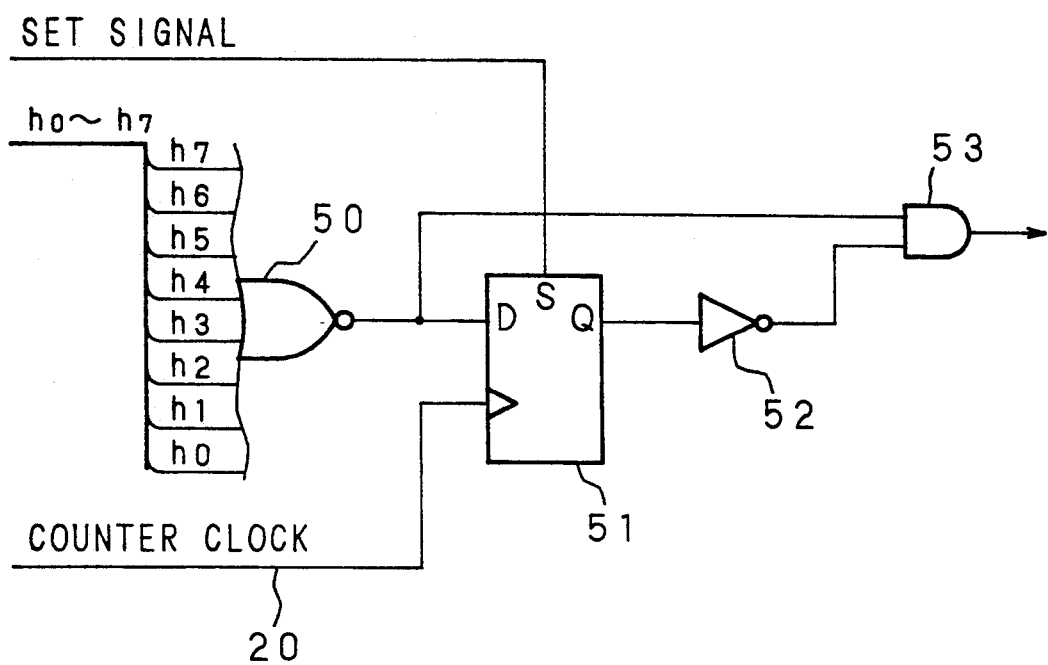
FIG. 7 is a circuit diagram to illustrate arrangement of a function end detector which characterizes the fuzzy computer in accordance with the second invention of the present invention.

The function end detectors 10 and 11 have the same or similar construction as shown in a circuit diagram of FIG. 7.

In FIG. 7, reference numeral 50 designates a NOR gate of 8 inputs, in which is inputted outputs h0 through h7 of the function generation unit 2 or 3. These outputs of the NOR gate 50 are sent to both of a data terminal D of a flip-flop 51 and either of two inputs of an AND gate 53.

A set signal is transmitted to a set input terminal S of the flip-flop 51, and the counter clock 20 is transmitted to a reset terminal thereof, respectively.

Output from an output terminal Q of the flip-flop 51 is given via an inverter 52 to the other input of the above-mentioned AND gate 53.

Incidentally, the set signal for setting the flip-flop 51 has been omitted in FIG. 6. And the outputs of the function generation units 2 and 3 are 8 bits.

Now will be described below operation of such a fuzzy computer of the present invention.

Figure 2A:
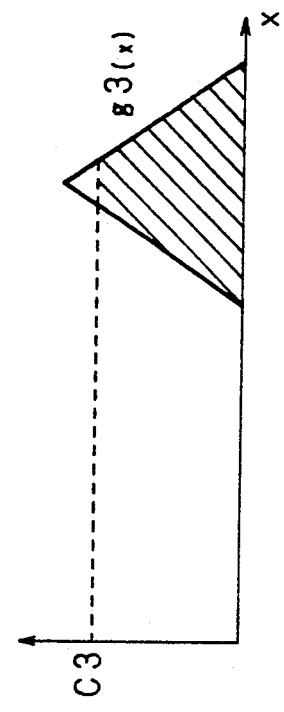
FIGS. 2(a), 2(b), 2(c), 2(d) and 2(e) are schematic views to explain functions whose centers of gravities are to be calculated in fuzzy operation.
Figure 2C:
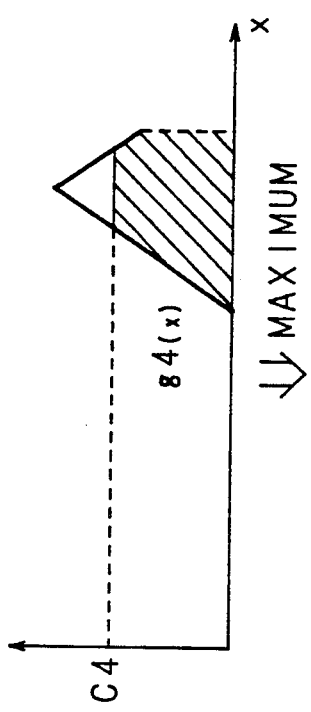
Figure 2E:
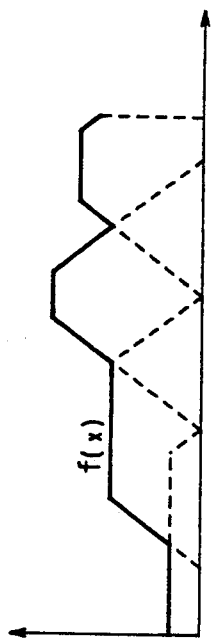
Figure 2B:
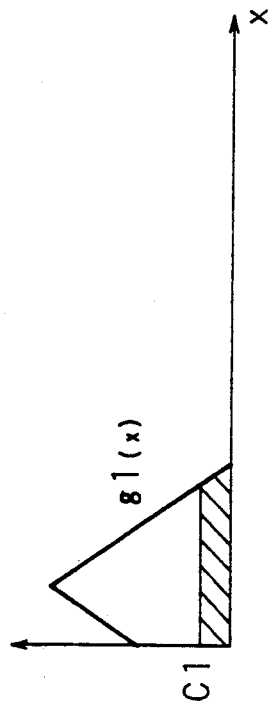
Figure 2D:
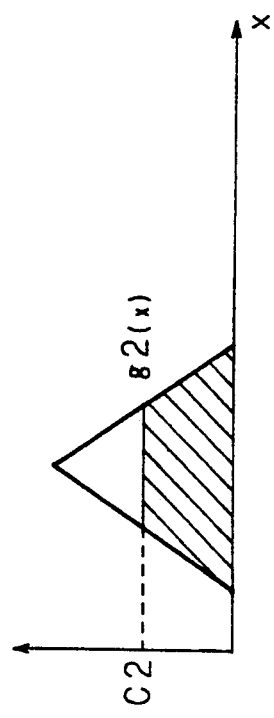
Figure 4:
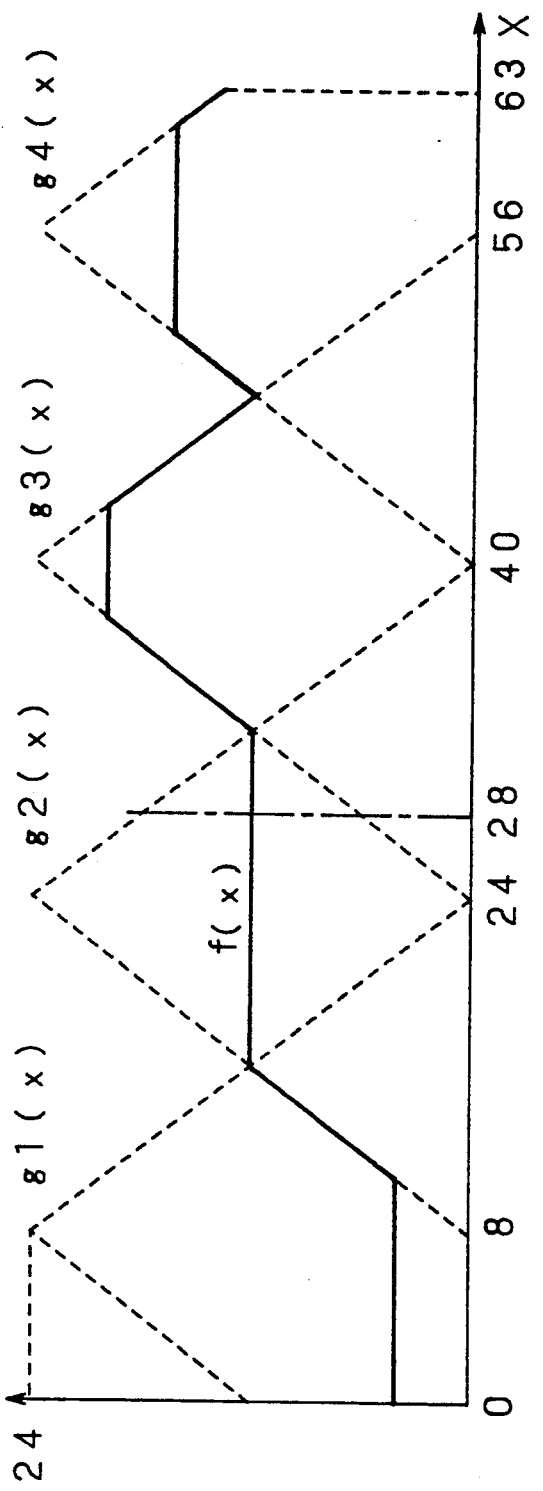
FIG. 4 is a schematic view to explain functions whose centers of gravities are to be calculated in fuzzy operation.
Figure 5:
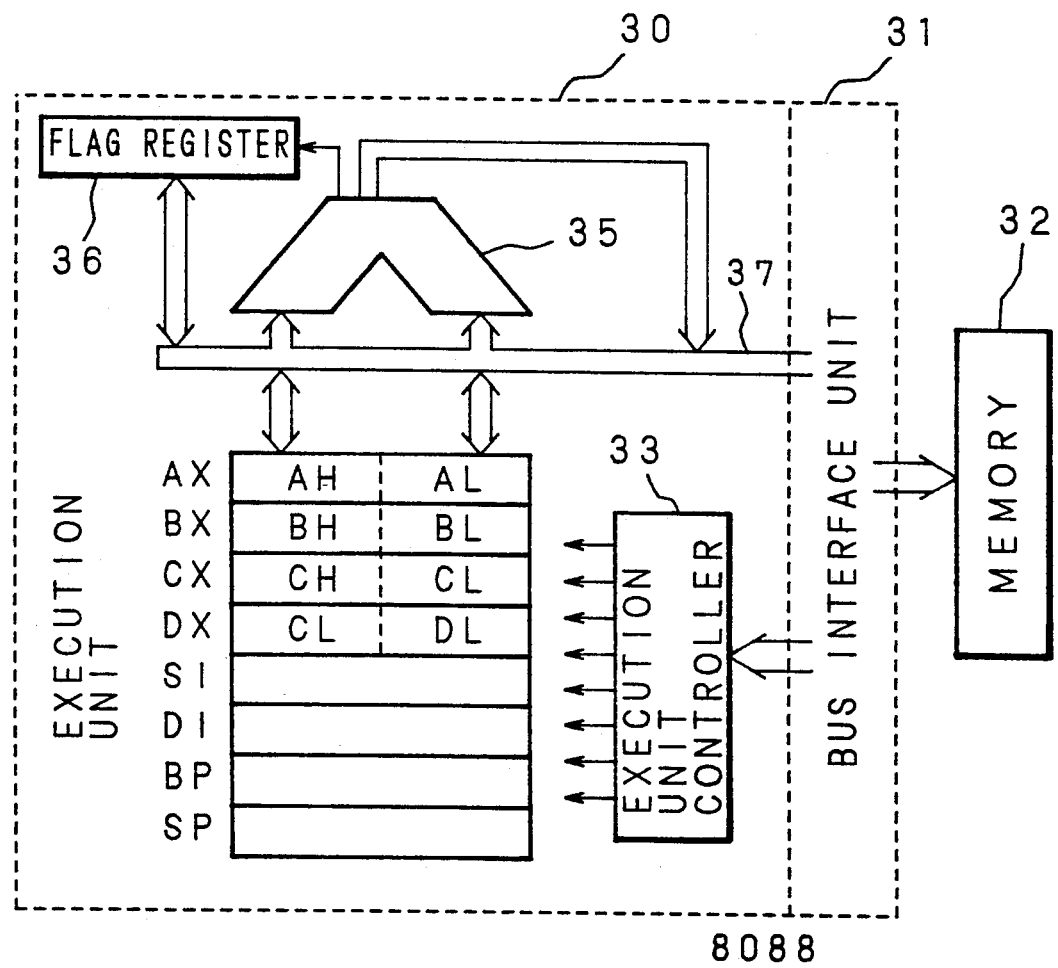
FIG. 5 is a block diagram to illustrate arrangement of MICROPROCESSOR 8088 manufactured by Intel Corp. as the conventional microprocessor system by way of an example.

The above-mentioned procedures of calculating the center of gravity of each of the functions f(x) as shown in FIG. 4 by this fuzzy computer will be referred to below.

The control circuit 1 carries out input/output of various kinds of signals required for controlling the whole computer system. In FIG. 6, however, in order to explain the fuzzy computer of the present invention, both of the counter clock 20 and register pointer 21 alone are shown as two signals specifically related to the control circuit 1.

The register file 4 is storing information for assigning configurations of the functions. To be concrete, the register file 4 is storing the information which is necessary for the function generation units 2 and 3 to generate the functions $g2(x)$, $g4(x)$ and the functions $g1(x)$, $g3(x)$, respectively.

The register file 5 is storing the upper bound cut values c1, c2, c3 and c4 for cutting the upper bounds of the respective functions $g1(x)$, $g2(x)$, $g3(x)$ and $g4(x)$, respectively.

Meanwhile, these values are assumed to have been fetched in advance from the external circuit into the register files 4 and 5 by the control circuit 1.

First, the control circuit 1 initializes the value of the down counter 6 to be 63 and the values of the registers 14, 15 to be 0, respectively, and sets the flip-flop 51 which is provided in the function end detectors 10 and 11.

Then, the control circuit 1 controls the register pointer 21 to make the register file 4 output information of the function $g4(x)$ to the function generation unit 2 and information of the function $g3(x)$ to the function generation unit 3, respectively, and the register file 5 allows the selector 7 to output the upper bound cut value c4 and the selector 8 to output the upper bound cut value c3, respectively.

Meanwhile, the down counter 6 shows the variable x, the register 14 shows $Q_j$, and the register 15 shows $P_j$, respectively, and the equation: $x=j$ is established here.

In this state, according to information of the register file 4 and down counter 6, the function generation units 2 and 3 generate the functions $g4(x)$ and $g3(x)$ ($x=63$, first), respectively.

Each of the selectors 7 and 8 compares its two inputs, and selects the smaller one and outputs this. To be concrete, the selector 7 compares output of the function generation unit 2 with output of the register file 5, and outputs the smaller one, while the selector 8 compares output of the function generation unit 3 with output of the register file 5, and outputs the smaller one. The outputs of the function generation unit 3 and register file 5, that is, the functions $g4(x)$ and $g3(x)$, respectively are cut at the upper bound cut values C4 and C3, respectively.

The selector 9 compares its two inputs and outputs the larger one. To be concrete, the selector 9 compares outputs of the both selectors 7 and 8 with each other and outputs the larger one. In other words, the selector 9 carries out the maximum value operation.

Incidentally, the functions $g1(x)$ and $g2(x)$ are both 0 until the variable x becomes 40, then, it is not necessary to take these functions into consideration.

And, the adder 12 adds $Q_j$ to $f(x)$. Concretely speaking, the adder 12 adds the output of the selector 9 which is $f(x)$ to the content of the register 14 which is $Q_j$.

The adder 13 adds $Q_j$ to $P_j$. To be concrete, the adder 13 adds the content of the register 14 which is $Q_j$ to the content of the register 15 which is $P_j$.

At the same time with these operations, each of the function end detectors 10 and 11 checks whether the output of each of the function generation units 2 and 3 is 0 or not, and then stores the result. And in the case where the present value is 0 as well as the stored value one step before is not 0, this function is assumed to have ended, and a signal showing the end is outputted to the control circuit 1.

In a circuit diagram of the function end detectors 10 and 11 shown in FIG. 7, the NOR gate 50 detects whether the function is 0 or not. In other words, in the case where all the 8 bits of the function values h0 through h7 to be outputted from the function generation units 2 and 3 are 0, that is, all the values of those 8 bits are 0, the NOR gate 50 outputs the value 1, and in the case where there is not less than 1 bit with the value 1, the NOR gate 50 outputs the value 0.

The flip-flop 51 stores this output of the NOR gate 50. And the inverter 52 and the AND gate 53 detect that the present function value is 0 and the function value one step before is not 0. To be concrete, in the case where the function value is not 0 at some point, the output of the NOR gate 50 is 0, and Q output of the flip-flop 51 is 0, and a signal 1 which is made by converting this Q output by the inverter 52 is transmitted to the other input of the AND gate 53. And in the case where the function value at the next step is not 0, output of the NOR gate 50 is 0, and both inputs of the AND gate 53 become 1 and 0, and output thereof becomes 0. However, in the case where the function value becomes 0, output of the NOR gate 50 becomes 1, accordingly, the both inputs of the AND gate 53 become 1, and the output thereof becomes 1. As a result, the function end detectors 10 and 11 detect the end of the function.

However, in the first step, that is, in the case where x=63, the flip-flop 51 is being set by the control circuit 1 and the value one step before that is considered as 0, and a signal showing that the function is not ended yet is outputted.

A summary of processings for one variable x has been described above.

After enough time required for the above processings passes, the control circuit 1 controls the counter clock 20 and updates the down counter 6, and the registers 14 and 15, and the flip-flop 51 being provided in the function end detectors 10 and 11 store the present input values.

As a result, 1 is subtracted from the content of the down counter 6, and the same processing is to be repeated. The control circuit 1 repeats this processing 64 times, that is, until the variable x becomes from 63 to 0. At this time, however, when the function end detector 10 outputs the signal showing the end of the function (here x=40), the control circuit 1 considers that the function g4(x) is ended and controls the register pointer 21 so as to allow the register file 4 to output information of the function g2(x) to the function generation unit 2 and to allow the register file 5 to output the upper bound cut value c2 to the selector 7.

In the same way, when the function end detector 11 outputs the signal showing the end of the function (here x=24), the control circuit 1 considers that the function is ended and controls the register pointer 21 so as to allow the register file 4 to output information of the function g1(x) to the function generation unit 3 and to allow the register file 5 to output the upper bound cut value c1 to the selector 8.

As a result, there are carried out the upper bound cut and the maximum value operation always for the functions in which the values corresponding to the variables x of each point are not 0. In other words, processings of the upper bound cut and maximum value operation are to be executed for the functions g4(x) and g3(x) when the variables x are in the range of 63 through 40, for the functions g3(x) and g2(x) when the variables x are in the range of 39 through 24, and for the functions g2(x) and g1(x) when the variables x are in the range of 23 through 0, respectively.

As a result, after the above processings are finished, Q is being stored in the register 14, and P is being stored in the register 15, respectively.

And finally, the divider 16 divides P by Q, and outputs the value of the center of gravity of the function f(x).

In the above embodiment, there is shown an example that the end of the function is detected by the function end detectors 10 and 11, however, information of the end of the function may have been stored in the control circuit 1 preliminarily. In other words, it may be adopted the arrangement that the equations $$63-40=23 \text{ and}$$

$$40-24=16$$

are stored in the control circuit 1 in advance, and there are carried out switch from the function g4(x) to g2(x) at the 23rd step from the initial state, and then switch from the function g3(x) to g1(x) at the 16th step 16. According to this arrangement, control of the control circuit 1 becomes complicated but it can dispense with the function end detectors 10 and 11.

Figure 8:
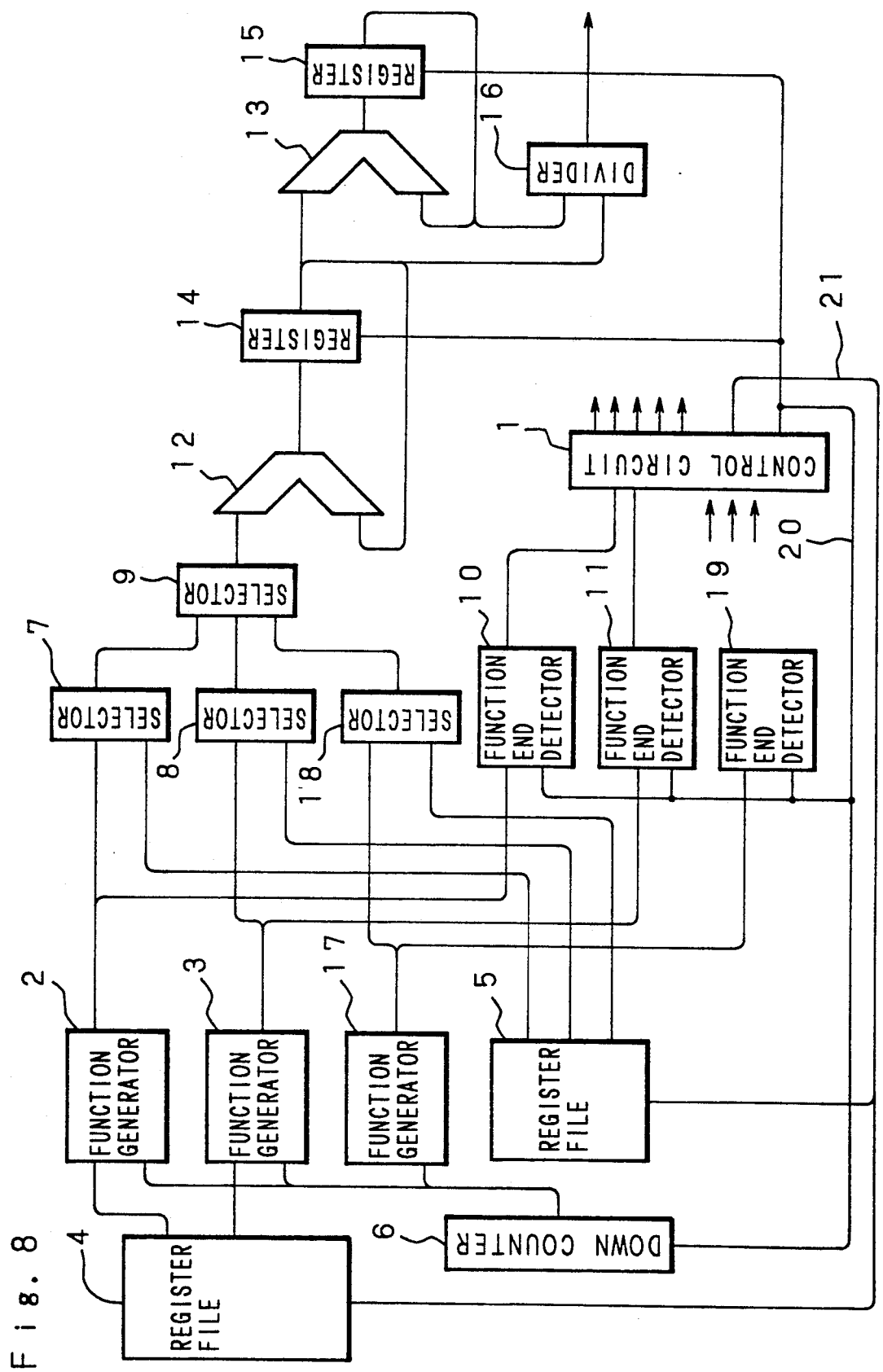

In the above embodiment, explanation has been made on the case where two membership functions are overlapped with each other, however, in the case where three membership functions are overlapped with each other, such arrangement as shown in FIG. 8 may be employed. In other words, it may be adapted that the function generation unit 17, the selector 18, and the function end detector 19 are provided in addition, and the register files 4 and 5 output information of the function also to both of the function generation unit 17 and the selector 18, respectively so that the selector 9 can compare the values of three inputs with each other to output the maximum value. And then, it may be adapted that three kinds of functions are generated at the same time, and for these functions, both processings of the upper bound cut and maximum value operation and the detection of the end of the functions are carried out at the same time.

There are provided two sets of function generation unit in the above embodiment shown in FIG. 6 and three sets of function generation unit in the above embodiment shown in FIG. 8, respectively, however, it may be enough to perform functions of them by only one set of function generation unit.

FIG. 9 is a block diagram to illustrate an embodiment in which time sharing is performed by using only one set of function generation unit.

As compared with the embodiment shown in FIG. 6, this embodiment shown in FIG. 9 dispenses with the function generation unit 3, the selector 8, and the function end detector 11, but adds a register 22 which temporarily holds output of the selector 7 and transmits this to the selector 9.

In such arrangement as using one set of function generation unit, first, there are executed the operations of generating functions and comparing them which are to be executed by both of the function generation unit 3 and the selector 8 in the arrangement shown in FIG. 6 by both of the function generation unit 2 and the selector 7, and these operation results are temporarily stored in the register 22.

And then, there are performed the operations of generating functions and comparing them which are to be executed by the function generation unit 2 and the selector 7 in the arrangement shown in FIG. 6, and there is made by the selector 9 a comparison between the comparison results of the selector 7 and the comparison results of the selector 7 which have temporarily been stored in the register 22 in advance.

Other operations are the same or similar to those of the arrangement shown in FIG. 6.

Furthermore in the above embodiment, processings of the upper bound cut and the maximum value operation are carried out by hardwares, however, the same or similar processings can be done according to a software or a microprogram by using a usual general-purpose computer system as the hardware. Now will be described below an example of this arrangement.

FIG. 10(a) and (b) illustrates an example of a program to perform calculation of the center of gravity of the function f(x) shown in FIG. 4 by using MICROPROCESSOR 8088 manufactured by Intel Corp.

Meanwhile, also in this program, as in the same way as the program of FIG. 3, the upper bound cut values c1, c2, c3 and c4 are assumed to have been loaded in four sets of register CL, CH, DL and DH preliminarily, respectively as the initial state.

In the program of FIG. 10(a) and (b), the variables x are divided into the ranges of 0 through 7, 8 through 23, 24 through 39, 40 through 55, and 56 through 63, and the processings of the both upper bound cut and maximum value operation and the integration operation for calculation of the center of gravity are executed for the respective values of the variables x in the range of 63 to 0. Among those ranges, in the ranges of the variables x from 0 through 7 and from 56 through 63, the function g1(x) and g4(x) alone have the values excepting 0, respectively, then, the maximum value operation is not executed but the upper bound cut and the integration operation alone are executed. And in the ranges of the variables x from 8 through 23, from 24 through 39, and from 40 through 55, the functions g1(x) and g2(x), the functions g2(x) and g3(x), and the functions g3(x) and g4(x) have the values excepting 0, respectively, then, the processings of the upper bound cut, maximum value operation, and integration operation are carried out for only those functions having the values excepting 0.

Now will be described below the program of FIG. 10 in detail.

In the program of FIG. 10(a) and (b), the 1st through 3rd lines designate a portion for initialization, in which 63 is loaded in the SI register which is the variable x, and 0 is loaded in both of the AX register which is $P_j$ and the DI register which is $Q_j$, respectively.

The 5th through 15th lines correspond to the variables x in the range of 56 through 63, and the 74th through 84th lines correspond to the variables x in the range of 0 through 7, respectively.

Among the 5th through 15th lines, the number of repeating times is loaded in the BP register in the 5th line first. And the function g4(x) is loaded in the BL register in the 6th line (here first variable x is 63). In the program of FIG. 10(a) and (b), [SI]+(gB−40) designates a memory of the address of the value which is made by adding the value gB−40 to the content of the SI register. The gB designates address of the memory, and there are being stored in the area of this memory the triangle functions g(x) showing configurations of the functions g1(x), g2(x), g3(x) and g4(x) as shown in FIG. 11. As may clearly be seen from FIG. 4 and FIG. 11, there are established the following equations as:

$g1(x)=g(x+8)$, $g2(x)=g(x-8)$, $g3(x)=g(x-24)$, and $g4(x)=g(x-40)$.

The SI register designates the variable x, and then, [SI]+(sB−40) results in designating the value of the function g4(x).

In the 7th through 9th lines, there is made a comparison between the loaded function g4(x) and the cut value c4 which is included in the DH register, and when the cut value c4 is smaller than the loaded function g4(x), the cut value c4 is transferred to the BL register, that is, the upper bound cut is executed.

In the 10th through 12th lines, processing of the integration operation of $P_j$ with $Q_j$ is carried out, which is similar to the 48th through 50th lines of FIG. 3 showing the example of the conventional program which has already been explained. However, the function f(x) is included in the BL register in this program.

The 13th line designates processing of subtracting 1 from the variable x in order to prepare for the next step.

In the 14th and 15th lines, there are carried out processings of subtracting 1 from the BP register and control of repeating the subtraction. In this program, the equation 1+63−56=8 has been loaded in the BP register first, and the above processings are repeated 8 times.

In the 74th through 84th lines, processings similar to the above processings are carried out for the variables x in the range of 0 through 7. In this program, however, there are employed the function g1(x) instead of the function g4(x), that is, [SI]+(gB+8) instead of [SI]+(gB−40) in the 75th line, and the cut value c1 being stored in the CL register instead of the cut value c4, respectively. Meanwhile, the subtraction has been repeated for the SI register which is the variable x by the above processings, accordingly, the value of the SI register becomes 7 at the point when the processing designated in the 74th line is carried out, and the above processings are repeated 8 times for the variable x in the range of 7 through 0.

The 17th through 34th lines, the 36 through 53rd lines, the 55th through 72nd lines correspond to the processings of the variables x in the ranges of 40 through 55, 24 through 39, 8 through 23, respectively.

Among the 17th through 34th lines, the number of repeating times (16 times here) is set in the 17th line.

And in the 18th through 21st lines, the upper bound cut is executed for the function g4(x) in the same way as in the 6th through 9th lines.

In the 22nd through 25th lines, in order to execute the upper bound cut for the function g3(x), the function g3(x) is cut at the cut value c3 being stored in the DL register in the same way as described above.

In the 26th through 28th lines, the maximum value operation is provided for the functions g4(x) and g3(x) whose upper bounds were cut, and a comparison is made between the BL register which is the function g4(x) and the BH register which is the function g3(x), and when the content of the BH register is larger than that of the BL register, the content of the BH register is transferred to the BL register, and when not, nothing is to be done.

In the 29th through 34th lines, integration operation of $P_j$ and $Q_j$, subtraction of the variable x, and control of repeating the subtraction are carried out as in the same way as those in the 10th through 15th lines. In these lines, the above processings are repeated 16 times.

The same processings are provided for the functions g2(x) and g3(x) in the 36th through 53rd lines and for the functions g2(x) and g1(x) in the 55th through 72nd lines, respectively. The values of the variable x, however, range from 39 through 24 and from 23 through 8, respectively.

In other words, the program of FIG. 10(a) and (b) results in carrying out the processings to be performed by the fuzzy computer shown in FIG. 6 according to the software, as a result, there are obtained Q in the AX register and P in the DI register, respectively as in the same way as FIG. 3.

Now will be made a comparison between the program shown in FIG. 10(a) and (b) and the example of the conventional program shown in FIG. 3. As may clearly be seen from the both figures, the program itself of the preferred embodiment of the present invention shown in FIG. 10(a) and (b) is larger than the conventional one shown in FIG. 3. In the program shown in FIG. 3, however, a total of 5 times of the 64-times repeating processing for the upper bound cut, maximum value operation, and integration operation for calculating the center of gravity for the functions g1(x) through g4(x) are carried out. In other words, in the program shown in FIG. 3, 320 times of repeat processing are carried out, while in the program shown in FIG. 10(a) and (b), the repeat processing is carried out by a total of 64 times as 8+16+16+16+8. As a result, execution speed of the repeat processing is far higher according to the program shown in FIG. 10(a) and (b) as compared to that according to the program shown in FIG. 3.

As has been described above, in the fuzzy computer of the present invention, the first invention adopts such arrangement of hardwares as to simultaneously carry out the upper bound cut, the maximum value operation, and the calculation of the center of gravity by directing attention that the membership functions are overlapped double or triple at the best with each other, and the second invention to adopts arrangement of software capable of executing the processing equivalent to the above arrangement of hardwares by using a general microprocessor system, then, the number of comparison operation in the upper bound cut and maximum value operation can be reduced, accordingly, it can realize the fuzzy computer capable of executing the processings of the upper bound cut, maximum value operation, and calculation of the center of gravity at higher speed.

Furthermore, according to the second invention of the present invention, the end of generation of the functions is detected by the hardwares, it can realize the fuzzy computer capable of executing the above processings at far higher speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A fuzzy computer which calculates the center of gravity of a fuzzy function, the value of the fuzzy function varying as a function of the value of an independent variable, the fuzzy function value for a given value of the independent variable being equal to the largest value in a set of cut membership values, each cut membership value equal to the lesser of the value of a membership function at the given value of the independent variable and an upper bound cut value for the membership function, the membership function also having a function end value whereby the value of the membership function is zero whenever the value of the independent variable is less than the function end value, comprising:

a down counter which outputs the value of the independent variable;

function generating means for generating a function value of a selected membership function according to the value of said independent variable;

storing means for storing the upper bound value corresponding to each membership function;

first selecting means for selecting and outputting a plurality of cut membership values, each value being the lesser of either a function value generated by said function generating means for a given membership function and a given independent variable or said upper bound value corresponding to said given membership function;

second selecting means for selecting and outputting the largest value from among the values selected by said first selecting means for said particular independent variable;

first adding means having at least two inputs and an output, said first adding means for adding values at said at least two inputs and providing a first sum at said output, a first of said at least two inputs coupled to said second selecting means;

a first register coupled to said first adding means, for holding said first sum, said first register having an output coupled to a second of said at least two inputs of said first adding means;

second adding means having at least two inputs and an output, said second adding means for adding values at said at least two inputs and providing a second sum at said output, a first of said at least two inputs coupled to said first register;

a second register coupled to said second adding means, for holding said second sum, said second register having an output coupled to a second of said at least two inputs of said second adding means;

function end detecting means for detecting when the value of said independent variable is less than said function end value for said selected membership function and for causing the fuzzy computer to skip further calculations involving said selected membership function when the value of said independent variable is less than said function end value; and dividing means for dividing said second sum by said first sum, to provide a value equal to the center of gravity of the fuzzy function.

2. A fuzzy computer as set forth in claim 1, wherein the number of said function generating means corresponding to said plurality of membership functions are provided, and each one of said first selecting means corresponding to each of the membership functions which are generated by each of said function generating means is provided.

3. A fuzzy computer as set forth in claim 1, wherein there are provided one of said function generating means for sequentially generating each of function values corresponding to each of said plurality of membership functions, one of said first selecting means for outputting comparison results of the function values which are sequentially generated by each of said function generating means, and a register which holds output of said first selecting means, and said second selecting means outputs the maximum value out of either the value being held in said register or the value of output of said first selecting means.

4. A fuzzy computer as set forth in claim 1, further comprising:

first comparison means for testing for equality of a first output from said function generating means and a predetermined value, and outputting a first result;

storing means for storing said first result; and second detecting means for, when said down counter completes counting, having a first input connected to the output of said storing means before said down counter completes counting and a second input connected to the output of said first comparison means after said down counter completes counting, detecting whether the output of said function generating means is within a predetermined range.

5. A fuzzy computer which calculates the center of gravity of a fuzzy function, the value of the fuzzy function varying as a function of the value of an independent variable, the fuzzy function value for a given value of the independent variable being equal to the largest value in a set of cut membership function values, each cut membership value equal to the lesser of the value of a membership function at the given value of the independent variable and an upper bound cut value for the membership function, the membership function also having a function end value whereby the value of the membership function is zero whenever the value of the independent variable is less than the function end, comprising:

a group of registers capable of storing a plurality of values, including a first and second stored value;

generating means for generating a plurality of membership function values; based on the value of the independent variable;

comparison means for comparing each of said plurality of membership function values with with a corresponding upper bound value for the membership function and for outputting a plurality of selection values;

a first adding means for adding said first stored value to at least one of said plurality of selection values and for replacing said first stored value with an output of said first adding means;

a second adding means for adding said first stored value to said second stored value and for replacing said second stored value with an output of said second adding means; and function end detecting means for detecting when the value of said independent variable is less than said function end value for said selected membership function and for causing the fuzzy computer to skip further calculations involving said selected membership function when the value of said independent variable is less than said function end value.

6. A fuzzy computer which calculates the center of gravity of a function which is composed of a plurality of membership functions by selecting largest function value among said function values of a plurality of membership functions where each membership function is limited by an upper bound value corresponding to the membership function, and where each membership function has a function end value, comprising:

a group of registers capable of storing a plurality of values, including a first stored value and second stored value;

operation means coupled to said group of registers for performing operations on the plurality of values stored said group of registers and replacing said plurality of values stored said group of registers;

control means for controlling said group of registers and said operation means; and a storing means for storing:

a first control procedure of said control means for generating a plurality of function values, each function value corresponding to one of a plurality of membership functions and a value which functions as an independent variable;

a second control procedure of said control means for comparing said plurality of function values with a plurality of upper bound values and for outputting a plurality of selection values;

a third control procedure of said control means for adding said first stored value to at least one of said plurality of selection values and for replacing said first stored value with an operation result of said operation means;

a fourth control procedure of said control means for adding said first stored value to second stored value and for replacing said second stored value with an operation result of said operation means; and a fifth control procedure of said control means for detecting when the value of said independent variable is less than said function end value for said selected membership function and for causing the fuzzy computer to skip further calculations involving said selected membership function when the value of said independent variable is less than said function end value.

* * * * *